(12) United States Patent
Wier

(10) Patent No.: US 6,250,720 B1
(45) Date of Patent: Jun. 26, 2001

(54) TENSIONER FOR A SAFETY BELT

(75) Inventor: Franz Wier, Göggingen (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/171,549

(22) PCT Filed: Apr. 23, 1997

(86) PCT No.: PCT/EP97/02067

§ 371 Date: Oct. 21, 1998

§ 102(e) Date: Oct. 21, 1998

(87) PCT Pub. No.: WO97/39923

PCT Pub. Date: Oct. 30, 1997

(30) Foreign Application Priority Data

Apr. 23, 1996 (DE) .......................................... 296 07 362 U
May 20, 1996 (DE) .......................................... 296 09 054 U

(51) Int. Cl.[7] .................................................. B60R 21/00
(52) U.S. Cl. ........................... 297/468; 280/806; 60/638; 297/480
(58) Field of Search ..................... 297/480, 479, 297/468; 280/806; 60/632, 638

(56) References Cited

U.S. PATENT DOCUMENTS

| | | | |
|---|---|---|---|
| 3,888,085 | * | 6/1975 | Larsonneur .............................. 60/635 |
| 3,942,819 | * | 3/1976 | Schwanz et al. .............. 280/150 SB |
| 4,008,909 | * | 2/1977 | Otani et al. ........................... 280/746 |
| 4,258,934 | * | 3/1981 | Tsuge et al. .......................... 280/806 |
| 4,458,921 | * | 7/1984 | Chiba et al. .......................... 280/806 |
| 5,553,890 | * | 9/1996 | Buhr et al. ............................ 280/806 |
| 5,568,940 | * | 10/1996 | Lane, Jr. ................................ 280/806 |

\* cited by examiner

*Primary Examiner*—Peter M. Cuomo
*Assistant Examiner*—Stephen Vu
(74) *Attorney, Agent, or Firm*—Tarolli, Sundheim, Covell, Tummino & Szabo L.L.P.

(57) ABSTRACT

A tensioner for a safety belt has a piston/cylinder unit (3), a compressed gas source (17), a belt engaging device (13), a traction transfer device (11) and a damping mechanism for the absorption of energy on deceleration of the belt engaging device (13). The damping mechanism comprises a first part (15) connected with the traction transfer device (11), projecting laterally from it and arranged outside the cylinder (5) in the non-actuated state of the tensioner, and comprises a second part connected with the cylinder (5) and provided on the end wall (23) of the cylinder close to the belt engaging device (13). At least one of the two parts is moved into the interior of the cylinder (5) during the damping process, so that the axial structural space of the tensioner (1) is small.

33 Claims, 11 Drawing Sheets

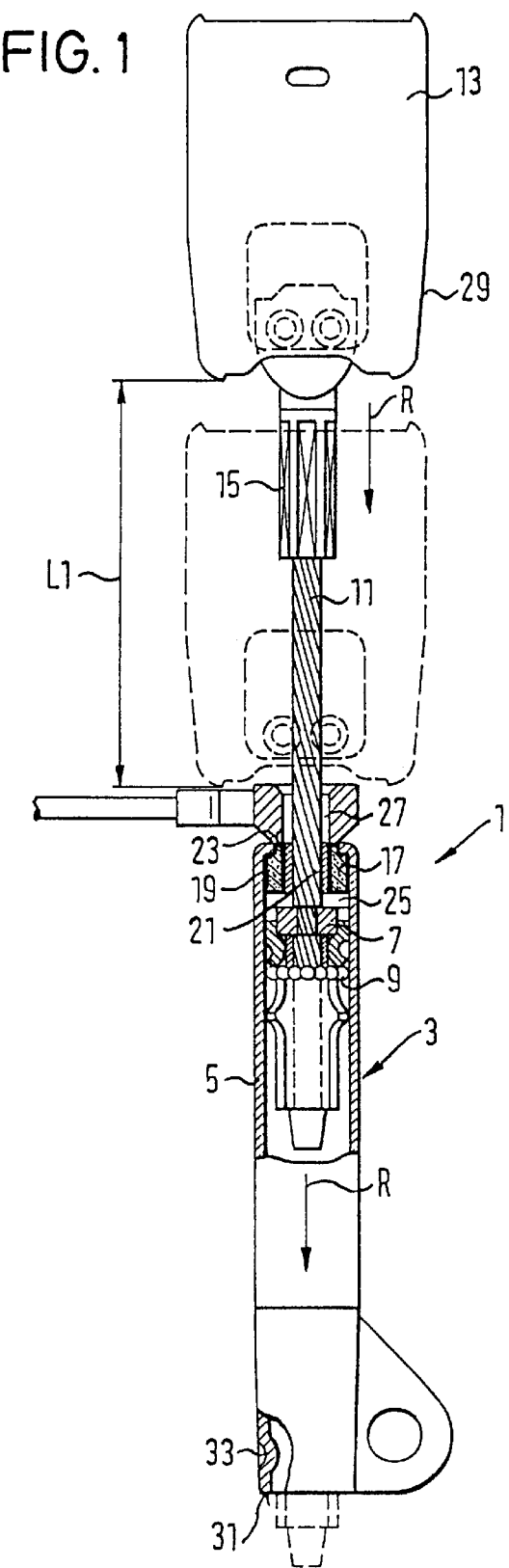

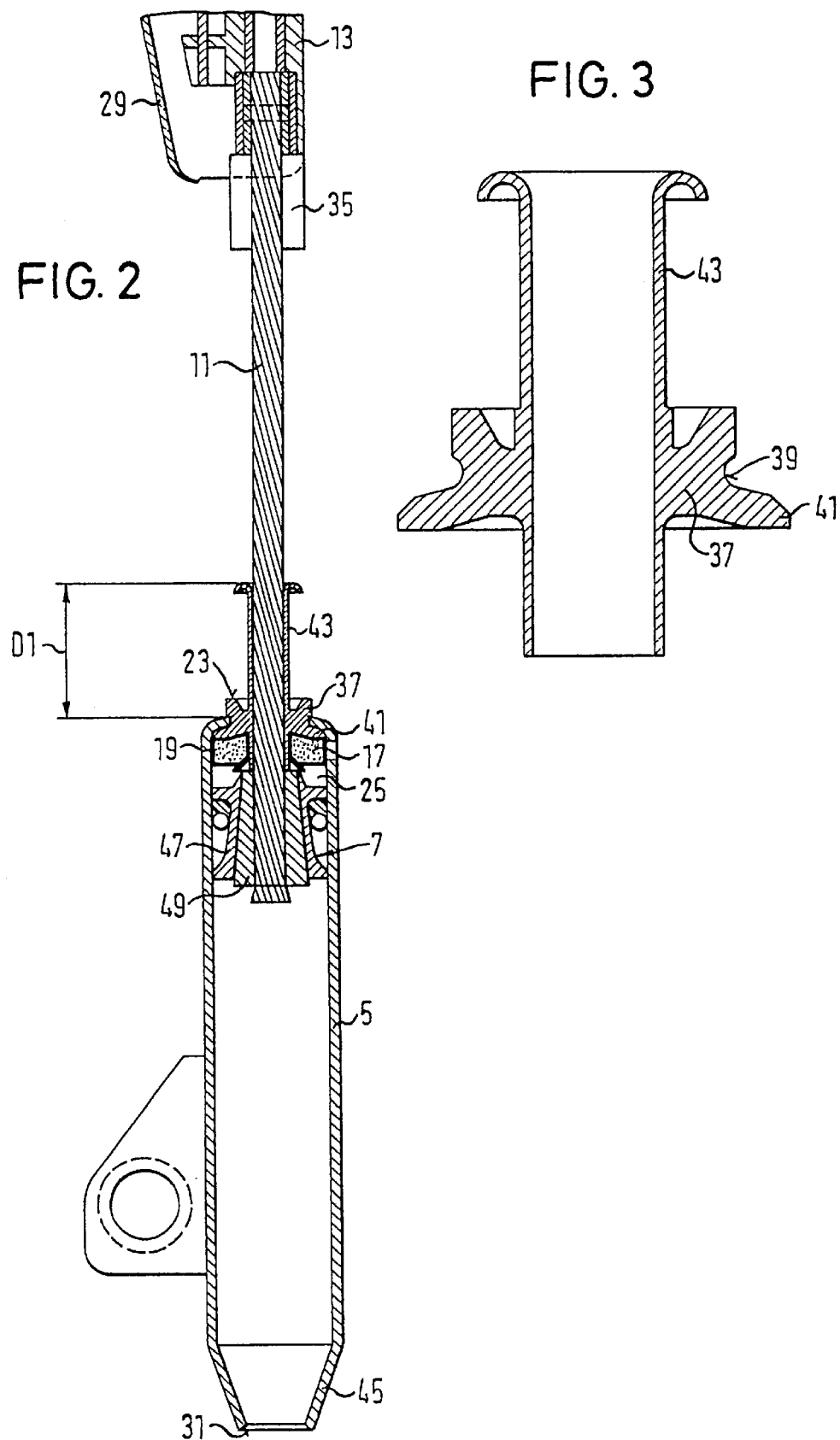

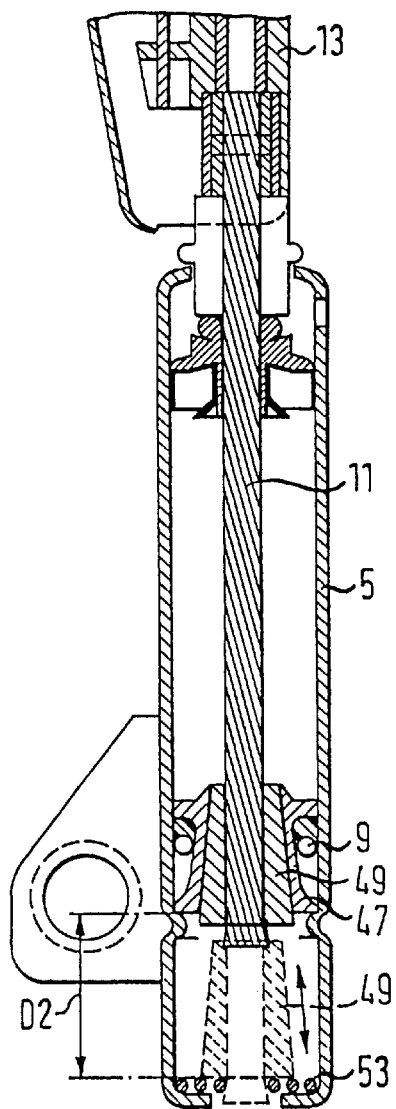
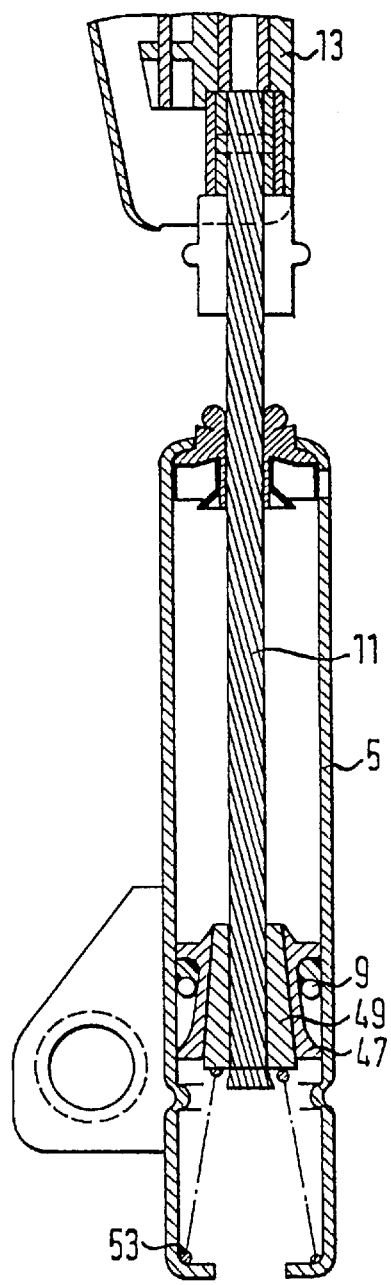

TENSIONER FOR A SAFETY BELT

FIELD OF THE INVENTION

The invention relates to a tensioner for a safety belt, with a piston/cylinder unit, which comprises a cylinder and a piston arranged in its interior, with a compressed gas source on the activation of which the piston is displaced, with a belt engaging means which engages on the safety belt, with a traction transfer means which connects the piston with the belt engaging means, and with a damping means for the absorption of energy on deceleration of the belt engaging means, the cylinder having a first end closer to the belt engaging means and a second end further away from it, the damping means having a first part connected with the traction transfer means, surrounding the traction transfer means at least partially and arranged outside the cylinder in the non-actuated state of the tensioner, and having a second part connected with the cylinder and provided on the end wall, the parts being moved towards each other on tensioning and providing for the damping.

BACKGROUND OF THE INVENTION

Tensioners for safety belts must be constructed to be as small as possible due to the small amount of space available in the vehicle. Inside or outside the cylinder, a damping means is usually provided, influencing the axial length of the tensioner in a negative manner, which damping means brakes the piston at the end of the tensioning path and in so doing absorbs energy, whereby stress peaks are reduced. Owing to the length of tensioning path and damping path which were necessary hitherto, known tensioners have such an axial overall length that they can not be installed in the vehicle without cable deflectors.

U.S. Pat. No. 4,458,921 discloses a generic tensioner having a damping member in the form of a sleeve which surrounds the traction cable and adjoins a deflector fitting connected to the traction cable. At the end of the tensioning process, this damping part cuts into a sealing member provided on the end face in the cylinder end wall and is caught therein. This process serves for the damping at the end of the tensioning path. However, the damping path is extremely short by design, so that great stresses occur during damping.

SUMMARY OF THE INVENTION

The invention provides a tensioner which with the same tensioning path is distinctly shorter in axial direction compared with known tensioners, without this being achieved at the expense of a poorer damping effect. This is achieved in a tensioner of the type initially mentioned in that the first part displaces the second part at least partially into the interior of the cylinder during the damping process. In tensioners known hitherto, the damping means is either arranged completely inside or completely outside the cylinder or one damping means is provided inside the cylinder and one outside the cylinder. When the damping means is outside the cylinder, the shape of the cylinder remains unchanged after the tensioning process. In contrast to this, the invention makes provision that at least one of the parts of the damping means penetrates into the interior of the cylinder at the end of the tensioning process. The displacement or deformation of the end wall of the cylinder is used in a specific manner for damping. The tensioning process is not negatively impaired by the change in shape of the cylinder, and the entire tensioner can be installed in the vehicle without a cable deflector, owing to the axially shorter type of construction due to the principle.

When the first part strikes onto the second part, according to a preferred embodiment, the second part can be displaced into the interior of the cylinder by the striking of the first part.

Furthermore, it is also possible that the first part penetrates into the second part and in so doing displaces the second part into the interior of the cylinder.

A third possibility consists in that the first part penetrates into the second part and the first part moves into the interior of the cylinder. This is able to be achieved for example in that the first part penetrates so deeply into the second part that it projects into the interior of the cylinder.

To simplify the manufacture, the second part is at least a section of the end wall of the cylinder at the first end. As a purposeful deformation and/or displacement of the second part on striking of the first part is desired, the second part is constructed as a separate part which is fastened to the cylinder and which is released from its fastening by the first part. Thereby, the forces acting between the first and second parts on deceleration of the belt articulation member can be kept in close, predetermined limits.

A simple possibility for the technical development of the second part consists in constructing this as a seal which separates the interior of the cylinder from its exterior and has an opening through which the traction transfer means extends. The second part thereby has a dual function, on the one hand acting for damping and on the other hand acting as a seal.

The damping effect can come about through various effects which can occur individually or in combination. On the one hand, by the purposeful plastic deformation of the first and/or of the second part on striking of the parts on each other a damping effect can be achieved, on the other hand it can be achieved by the penetrating of the first or second part into the interior of the cylinder and the resultant reduction in volume of the working space inside the cylinder. In the latter case, the cylinder acts like a pneumatic shock absorber, because on penetration of the first or of the second part into the interior of the cylinder, work is carried out against the remaining compressed gas situated in the working space.

The plastic deformation can be achieved by the provision of members between the first and the second part or, according to a preferred embodiment, in that the second part has a sleeve-shaped section which extends substantially outside the cylinder in the non-actuated state of the tensioner. In the actuated state of the tensioner, the first part deforms the sleeve-shaped section.

The previously described mode of operation of a hydraulic shock absorber can be achieved in that inside the cylinder a working space is provided for the gas which is released and also a stop is provided for the piston. The position of the first and second part, of the piston and of the stop are coordinated with each other such that after the striking of the piston onto the stop, the first and/or second part penetrates into the interior of the cylinder and leads to the reduction of the volume of the working space.

In order to prevent too much compressed gas from escaping from the working space via the end wall at the first end of the cylinder on reduction of the volume of the working space, a damping piston is provided which is arranged in the region of the first end in the non-actuated state of the tensioner. The damping piston is displaced in the direction of the piston by the first part and thereby reduces the volume of the working space. The second part can be coupled with the damping piston or can be integrally connected therewith, forming one piece.

A radial gap between the damping means and the inner wall of the cylinder can become increasingly smaller with an increasing distance covered by the damping piston, so that less gas emerges from the piston and the resistance for the damping piston increases.

According to a preferred embodiment, a fastening means is provided which connects the traction transfer means and the piston with each other, and which is constructed so that the traction transfer means is uncoupled from the piston on deceleration of the piston. Thereby, two units are produced which are separate from each other, namely on the one hand the piston and on the other hand the traction transfer means with the belt articulation member. These two units can be braked separately from each other and chronologically one after the other, if necessary with two separate damping means.

In order to save further structural space, the compressed gas source can be arranged inside the cylinder and can adjoin the end wall at the first end. The housing of the gas generator can thereby be part of the damping piston and can be displaced further into the interior of the cylinder on striking of the first part.

BRIEF DESCRIPTION OF THE DRAWINGS

Further features and advantages of the invention will be apparent from the following description and from the following drawings, to which reference is made. In the drawings:

FIG. 1 shows a longitudinal sectional view of the tensioner according to the invention in the non-actuated state and, shown with broken lines, in the actuated state;

FIG. 2 shows a second embodiment of the tensioner according to the invention in longitudinal sectional view in the non-actuated state;

FIG. 3 shows a longitudinal sectional view of the damping piston used in the tensioner according to the invention in accordance with FIG. 2;

FIGS. 9 to 11 show a further embodiment of the tensioner according to the invention in various phases which correspond to the phases shown in FIGS. 2, 4 and 5 or 6, 7 and 8;

DETAILED DESCRIPTION OF THE INVENTION

Figure 4:
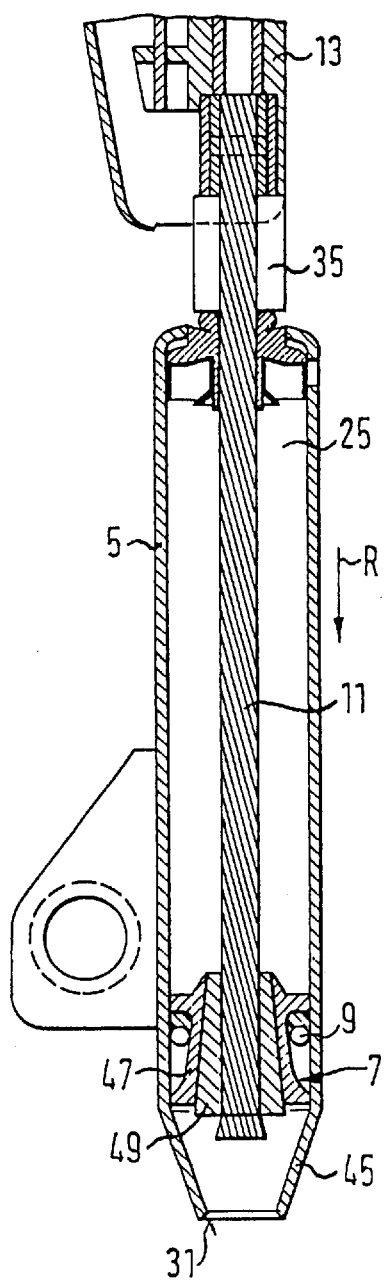
FIG. 4 shows the tensioner shown in FIG. 2 after the entire tensioning path has been covered.

In FIG. 1 a tensioner 1 for a safety belt (not shown) is illustrated. The tensioner comprises a piston/cylinder unit 3, consisting of a cylinder 5 and of a piston 7 displaceably arranged inside the cylinder and having conventional locking members 9 on its partially conical outer contour. A traction transfer means 11 in the form of a traction cable is fastened in a non-detachable manner on the piston 7. At the opposite end of the traction transfer means 11 a belt engaging means 13 in the form of a belt buckle is fastened via a thimble 15. The thimble 15 projects radially with respect to the traction transfer means 11. Inside the cylinder, a compressed gas source 17 is arranged on the first end of the cylinder 5 facing the belt engaging means 13. The compressed gas source 17 has a hollow housing 19 in the shape of a circular ring, which is filled with propellant. The traction transfer means 11 extends through a central opening 21 of the housing 19 up to the piston 7. The housing 19 closes the otherwise open end wall 23 of the piston 7 towards the exterior and serves as a seal between the interior of the cylinder 5 and the exterior. The inner face of the housing 19 serves in addition as a guide and seal for the traction transfer means 11 sliding along the inner face of the housing 19 during the tensioning process.

Between the piston 7 and the end wall of the housing 19 closer to the piston 7, a working space 25 is formed into which the gas flows after the igniting of the propellant inside the compressed gas source 17. Adjoining the end wall 23 is an annular ignition unit 27 which ignites the propellant in the case of restraint and provides for a displacement of the piston 7 together with the traction means 11 and the belt buckle 13. The maximum tensioning path is designated by L1 and the direction of the tensioning process is designated by R.

The tensioner shown in FIG. 1 is constructed very short in axial direction, because the traction transfer means 11 is constructed so short compared with the length of the cylinder 5 that the thimble 15 penetrates into the interior of the cylinder 5 in the case of restraint and the housing 29 of the belt buckle lies approximately against the ignition unit 27. On the inner wall of the cylinder 5, in the region of the completely open end wall 31 remote from the belt buckle 13, a stop 33, projecting inwardly by pressing in, is formed for the piston 7. The cylinder 5 is constructed so short and the stop 33 is arranged so close to the end wall 31 that the traction transfer means 11 and a portion of the piston 7 project out from the cylinder 5 after the tensioning has been completed, as is shown by interrupted lines. Owing to the open end wall 31, the tensioner 1 can be constructed shorter, without this being at the expense of the tensioning path. As the tensioner 1 is usually arranged a few millimeters in front of a component on the vehicle side, which is usually formed by the vehicle floor or a carpet on the vehicle floor, in the case of restraint this intermediate space can still be utilized to extend the tensioning path or the damping path.

In order to avoid stress peaks on braking of the piston 7, of the traction transfer means 11 and of the belt buckle 13 after the tensioning path L1 has been covered, a damping means is provided. This damping means consists of several parts, namely a first part which is connected with the traction transfer means 11 and projects laterally from it and, in the non-actuated state of the tensioner 1, is arranged outside the cylinder 5. This first part can be a sleeve pressed onto the traction transfer means 11 or, as shown in FIG. 1, it can be the thimble 15 itself, whereby the axial total length is kept small. Furthermore, as is illustrated for example in FIG. 17, it can also be a cable fastening 16 pressed onto the traction transfer means 11 which is constructed as a traction cable. A second part of the damping means is connected with the cylinder and is provided on the end wall 23. The second part, towards which the first part moves during the tensioning process, is in the embodiment illustrated in FIG. 1 is the housing 19 of the compressed gas source 17. The damping takes place in that the thimble 15 strikes against the housing 19 and pushes it further into the interior of the cylinder 5. Also the thimble 15 penetrates into the interior of the cylinder 5. In the embodiment shown in FIG. 1, the housing 19 has numerous functions, namely of enclosing the propellant, of separating the interior of the cylinder 5 from the exterior, of serving as a guide for the traction transfer means 11 and finally of acting as a part of the damping means, by offering a resistance to the displacement by the thimble 15. Depending on the thickness of the housing wall, the housing 19 can also be deformed plastically and can thereby absorb energy on impact of the thimble 15.

Figure 17:
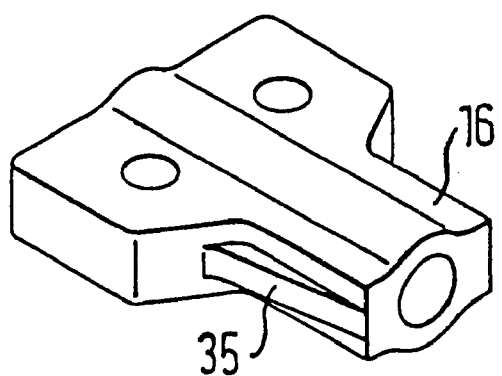
FIG. 17 shows a cable fastening which can form the first part of the damping means.

In the embodiment illustrated in FIG. 2, the ignition unit is no longer arranged on the end face but rather on the covering face of the cylinder 5. The first part of the damping means is no longer formed by the thimble 15, because the fastening of the belt buckle 13 on the traction transfer means 11 takes place inside the housing 29. Instead of this, two ribs 35 project with respect to the housing 29 in the direction of the cylinder 5, which form the first part of the damping means. With the use of a cable fastening, as is shown in FIG. 17, the ribs 35 are part of the cable fastening and not of the housing 29. The second part of the damping means is not formed by the housing 19 of the compressed gas source, but rather by a damping piston 37 which is shown in further detail in FIG. 3. The damping piston 37 is made of metal, preferably aluminum, and represents a major part of the end wall 23 of the cylinder 5. The damping piston 37 is fastened by deformation, namely by rolling or beading, to the radially inwardly bent rim of the cylinder 5, which forms a part of the end wall 23. For this, the damping piston 37, as shown in FIG. 3, has a radial recess 39 on its outer periphery, into which the rim of the cylinder 5 engages. A disc-shaped section 41 projecting into the interior of the cylinder 5 touches the cylindrical inner face of the cylinder 5 and lies in a gas-tight manner against it (cf. FIG. 2). The damping piston 37 has in addition a sleeve-shaped section 43 extending substantially outside the cylinder 5 in the non-actuated state of the tensioner 1, which section 43 inter alia has a guiding function for the traction transfer means 11. Furthermore, the sleeve-shaped section 43 also extends into the interior of the cylinder 5. The compressed gas source 17 immediately adjoins the section 43. The section 43 is pressed with the traction transfer means 11, in order to improve the sealing effect. In addition, this prevents the traction transfer means 11 from moving, e.g. when the occupant unintentionally strikes against the belt buckle 13. Only after a predetermined tripping moment has been exceeded can the traction transfer means release itself from this locking means in the case of restraint. To achieve a better sealing effect, when a traction cable is used as traction transfer means 11, it is coated externally in the region of the damping piston 37 with a sealing material such as wax or silicone, because the traction cable does not have a smooth external surface.

In contrast to the cylinder shown in FIG. 1, the cylinder 5 shown in FIG. 2 has a second end 31 which is characterized by a conically tapered cylinder wall 45.

In the case of restraint, the propellant is ignited and the generated gas flows into the working space 25, whereby it displaces the piston 7 in the direction of the end face 31. Towards the end of the tensioning path, the ribs 35 strike against the sleeve-shaped section 43 and deform it plastically, whereby part of the energy is absorbed and stress peaks are reduced. The path by which the section 43 can be deformed plastically is designated by D1.

Roughly when the sleeve-shaped section 43 has been completely plastically upset, as shown in FIG. 4, the piston 7 will also have reached the lower end of the circular cylindrical section of the cylinder 5. The conical section of the cylinder wall 45 serves as a stop for the piston 7. The piston 7 is composed of several parts, inter alia of an outer sleeve 47 of steel lying against the inner face of the cylinder 5, the opening of which sleeve 47 is designed conically. The conical opening is filled by a fastening means 49 which is formed by an aluminum cone 49 which is pressed onto the traction transfer means 11. As soon as the sleeve 47 strikes against the conical cylinder section 45, the fastening means 49 detaches itself from the sleeve 47 (cf. FIG. 5), so that the sleeve 47, which together with the cone 49 forms the piston 7, is uncoupled from the traction transfer means 11 and the belt buckle 13. Thereby, the parts which are uncoupled from each other can be separately decelerated and damped, whereby a smaller structural space is necessary. The tensioning path is delimited by the piston 7 striking against the conical cylinder section 45; the subsequent further movement of the traction transfer means 11 and of the belt buckle 13 serves for their deceleration using the damping means.

Figure 5:
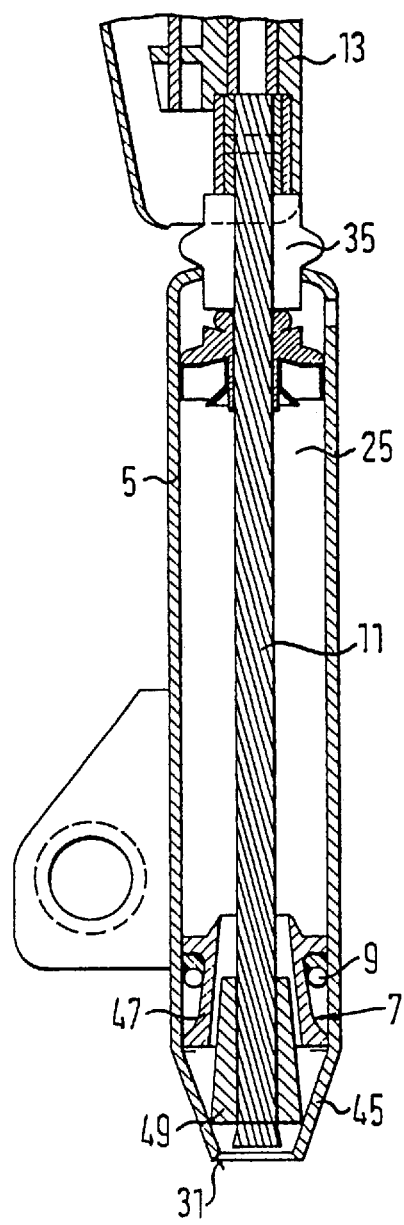
FIG. 5 shows the tensioner shown in FIGS. 2 and 4, in which the belt buckle with the traction cable moves beyond the tensioning path in the direction of the floor of the vehicle.

Whilst the fastening means moves out from the sleeve 47, the ribs 35 are deformed plastically, whereby energy is absorbed (cf. FIG. 5). Finally, owing to the high speed of the belt buckle 13 and of the traction transfer means 11, the fastening is released between the damping piston 37 and the cylinder 5, so that the damping piston together with the housing 19 is moved further into the interior of the piston, as is shown in FIG. 5. The volume of the working space 25 is reduced thereby and the damping piston 37 operates against the pressure of the compressed gas still present in the working space 25, so that the cylinder operates with the damping piston 37 like a pneumatic damper. The gas flows between the sleeve 47 and the fastening means 49 into the open air. When the fastening means 49 strikes onto the conical cylinder section 45, the damping and deceleration of the traction transfer means 11 and of the belt buckle 13 is terminated. The vehicle occupant moving forward after the belt tensioning is completed then presses the belt buckle 13 together with the fastening means 49 back into the position shown in FIG. 4. The locking members 19 prevent a displacement of the piston and hence also of the belt buckle 13 contrary to the tensioning direction R. In this embodiment, the damping of the moving parts is achieved by plastic deformation and by a hydraulic damping. These effects can take place at the same time or at least partially staggered with regard to time.

The damping piston 37, which also acts as a seal, exerts a clamping force on the traction transfer means 11 when the tensioner 1 is not actuated, which clamping force prevents an unintentional rotation or axial displacement of the traction transfer means e.g. by a vehicle occupant hitting against the belt buckle 13 inadvertently.

In addition, the conical cylinder section 45 can be deformed plastically by the sleeve 47 of aluminum or the fastening means 49, in order to reduce energy.

So that the damping piston 37 is not abruptly decelerated, interference contours can also be provided protruding inwardly from the inner face of the cylinder 5, which contours partially decelerate the piston 7 and/or the damping piston 37.

Figure 6:
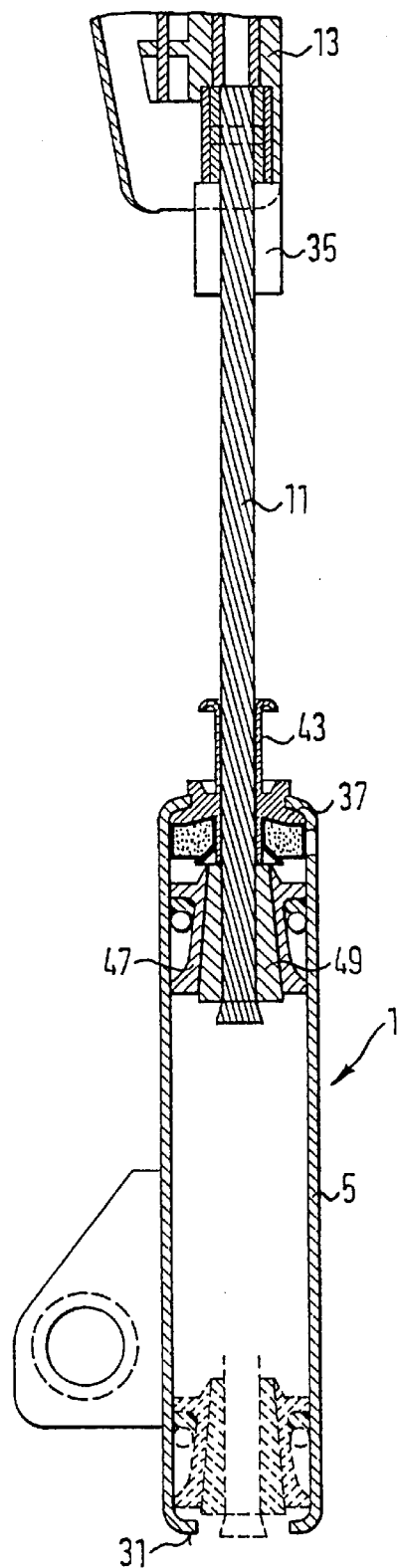
FIG. 6 shows a longitudinal sectional view of a third embodiment of the tensioner according to the invention, in the non-actuated state.
Figure 7:
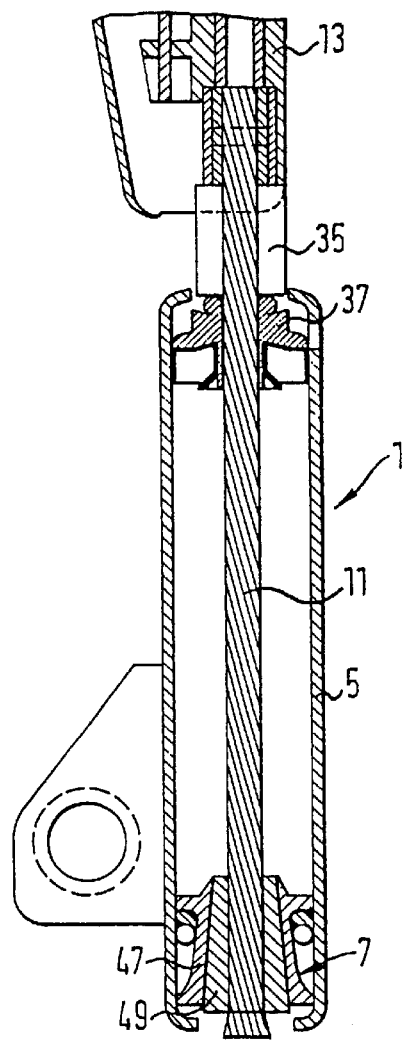
FIG. 7 shows a longitudinal sectional view through the tensioner shown in FIG. 6 after the tensioning path has been covered, in accordance with the state illustrated in FIG. 4.
Figure 8:
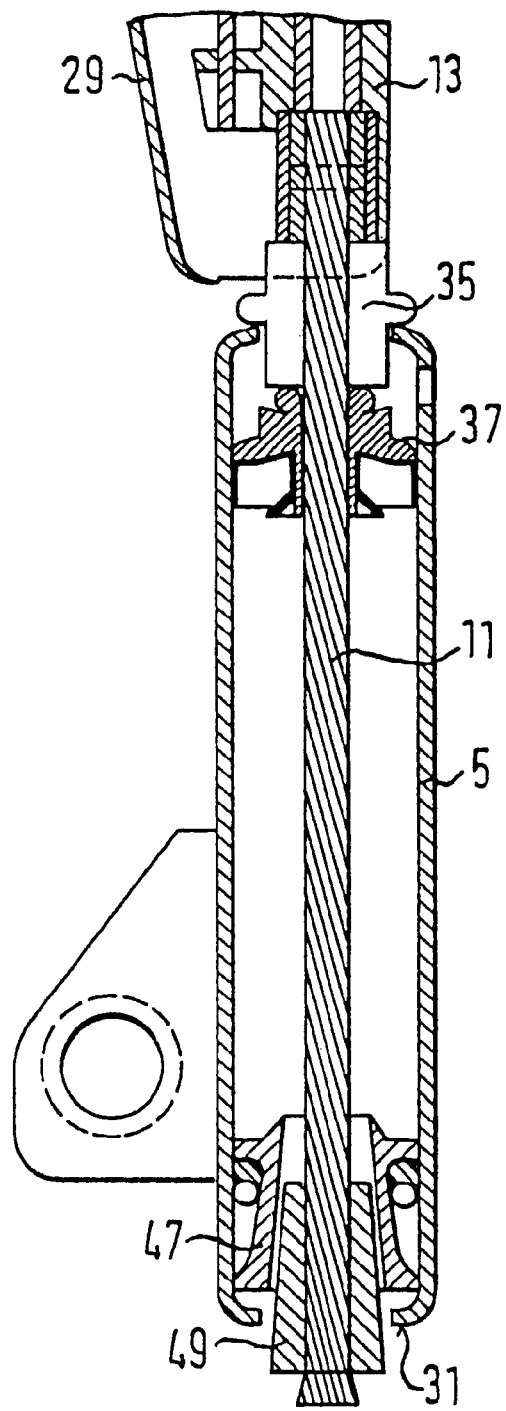
FIG. 8 shows the tensioner shown in FIGS. 6 and 7 at a moment after the tensioning path has been covered, when the belt buckle and the traction cable move further in the direction of the vehicle floor, in accordance with the moment illustrated in FIG. 5.

In the embodiment of the tensioner 1 shown in FIGS. 6 to 8, the cylinder 5 is constructed shorter than in the embodiment illustrated in FIGS. 2 to 5, because the fastening means 49, constructed as a carrier, passes partially through (cf. FIG. 8) the open end wall 31 of the cylinder 5 after the tensioning has been completed (cf. FIG. 7). After the ribs 35 are deformed by striking onto the cylinder 5 and the remaining housing 29 of the belt buckle 13 has approximately reached the cylinder 5, the belt buckle 13 and the traction transfer means 11 are completely decelerated.

Figure 9:
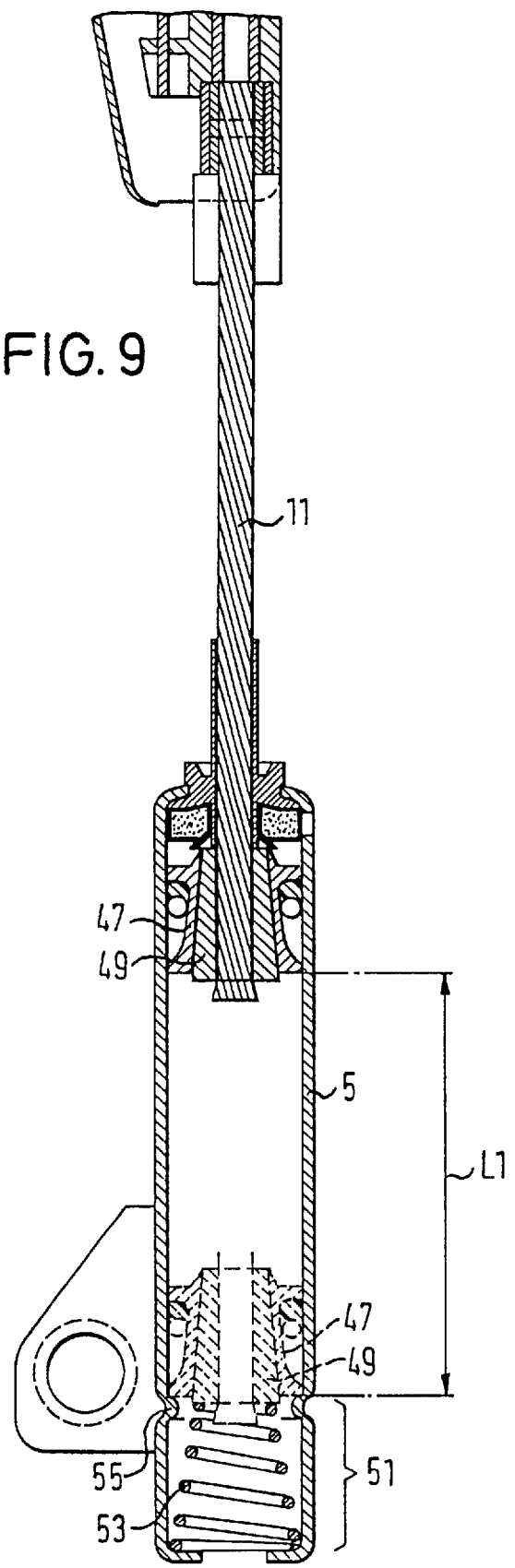

The embodiment of the tensioner illustrated in FIGS. 9 and 11 differs from that illustrated in FIGS. 6 to 8 in that the cylinder 5 is lengthened by a section 51 into which the fastening means 49 moves after detaching from the sleeve 47. A recess forms the stop 55 for the piston 7. An elastic spring member 53 in the form of a tapered spring serves on the one hand to a small extent for the damping of the traction transfer means 11, when the fastening means 49 detaches itself from the sleeve 47 (see the lower position of piston 7 in FIG. 9). On the other hand, when the fastening means 49 has moved out from the sleeve 47 by the damping path D2 (cf. FIG. 10), the spring member 53 moves the fastening means back into engagement with the sleeve 47. When the vehicle occupant wishes to take off the safety belt after the tensioning has been completed, the elastic spring member 53 offers a certain resistance to a displacement of the belt buckle, so that it is ruled out that the unlocking button on the belt buckle 13 can no longer be actuated by displacement of the belt buckle 13. This relates in particular to tensioners which are arranged on a rear seat bench because without the provision of the elastic spring member 53, these tensioners would sink between the seat cushion and the back cushion after the tensioning process, so that the vehicle occupant can no longer take hold of the release button. The elastic spring member 53 therefore leads, after tensioning is completed, to the position as shown in FIG. 11 of the belt buckle 13 relative to the cylinder 5.

Figure 12:
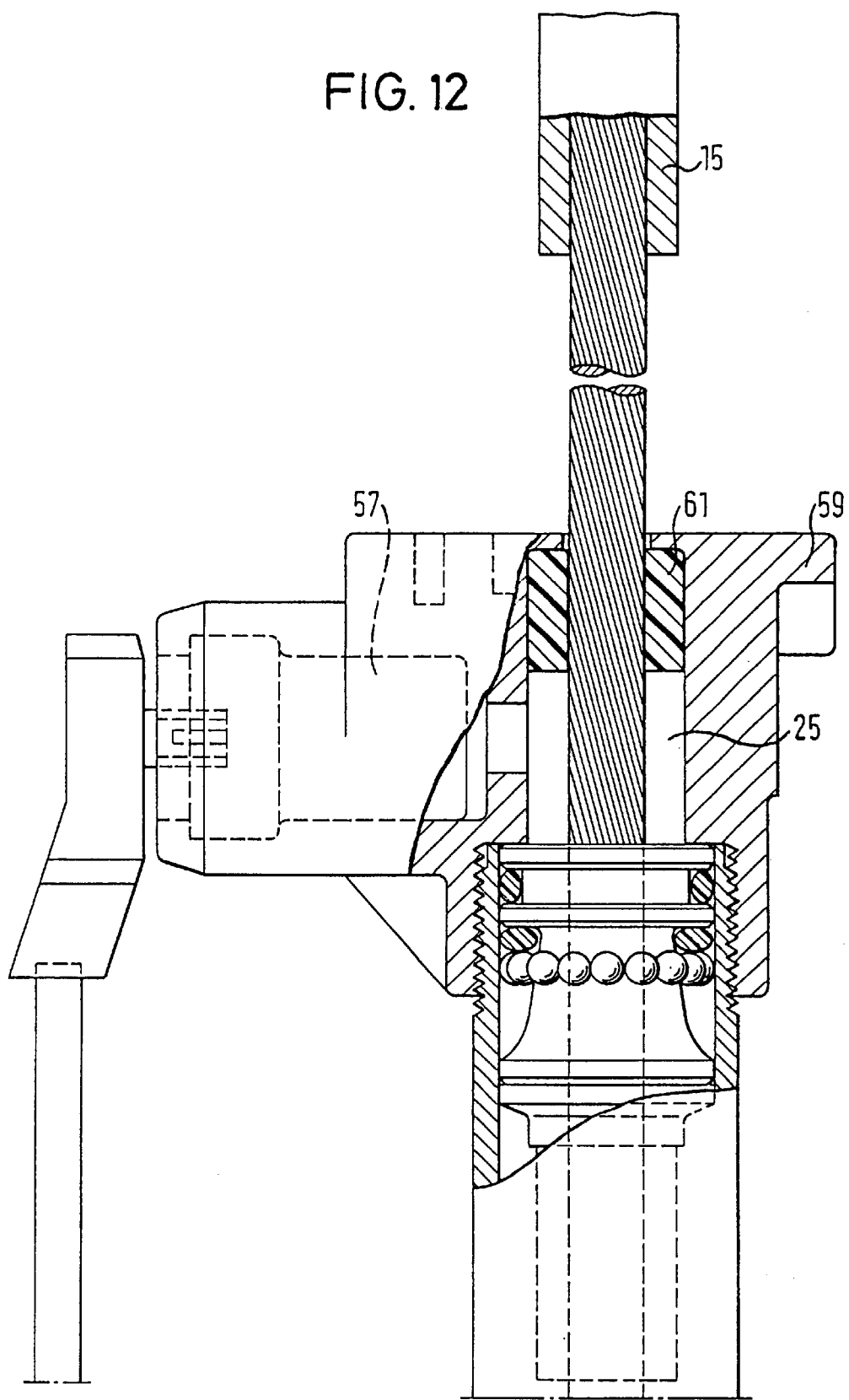
FIG. 12 shows a further embodiment of the tensioner according to the invention with a propellant charge arranged outside the cylinder.

In the embodiment illustrated in FIG. 12, a propellant charge 57 provided outside the interior of the cylinder is accommodated in a housing 59 which is screwed onto the cylinder 5. In the case of restraint, a ring seal 61 provided in the housing 59 and surrounding the traction transfer means 11 is pushed by the thimble 15 into the working space 25, which is formed inside the housing 59 which represents an extension of the cylinder 5.

Figure 13:
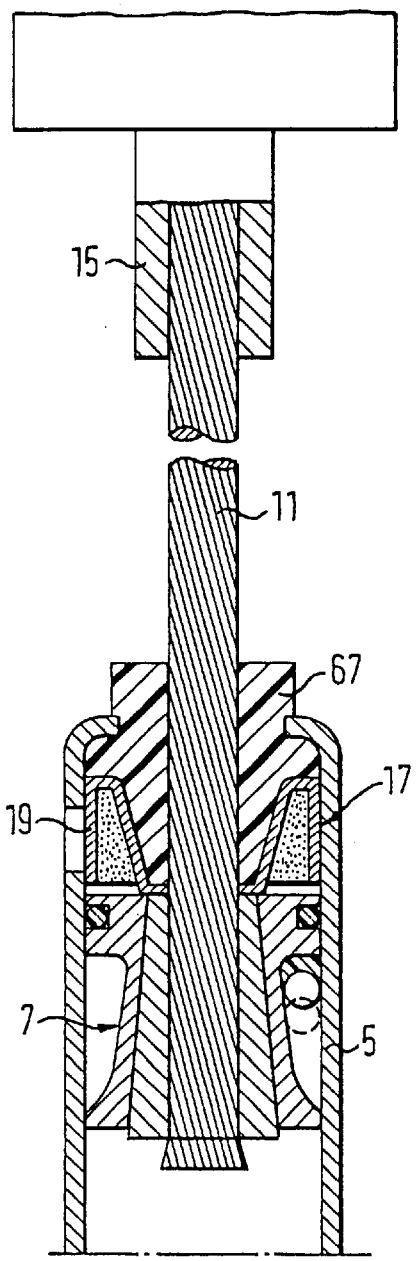
FIG. 13 shows an embodiment of the tensioner according to the invention in non-actuated state, in which the damping piston is not plastically deformed.
Figure 14:
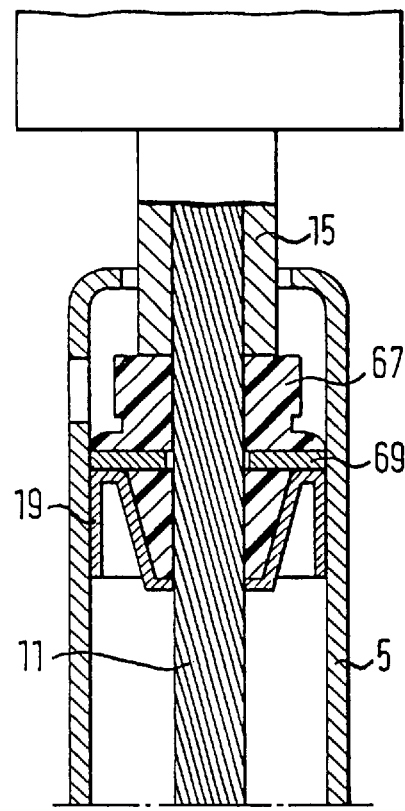
FIG. 14 shows the tensioner shown in FIG. 13 in actuated state.

In the embodiment illustrated in FIG. 13 a damping piston 67 of plastic is provided, which on striking of the thimble 15 is torn from its anchoring on the cylinder 5 and together with the housing 19 of the compressed gas source 17 is displaced in the direction of piston 7. In contrast to the damping piston 37 shown in FIG. 2, the damping piston 67 is, however, not deformed plastically, so that it serves exclusively for a pneumatic damping. In FIG. 14 in addition a reinforcement plate 69 is indicated, which serves for the reinforcement of the damping piston 67.

Figure 15:
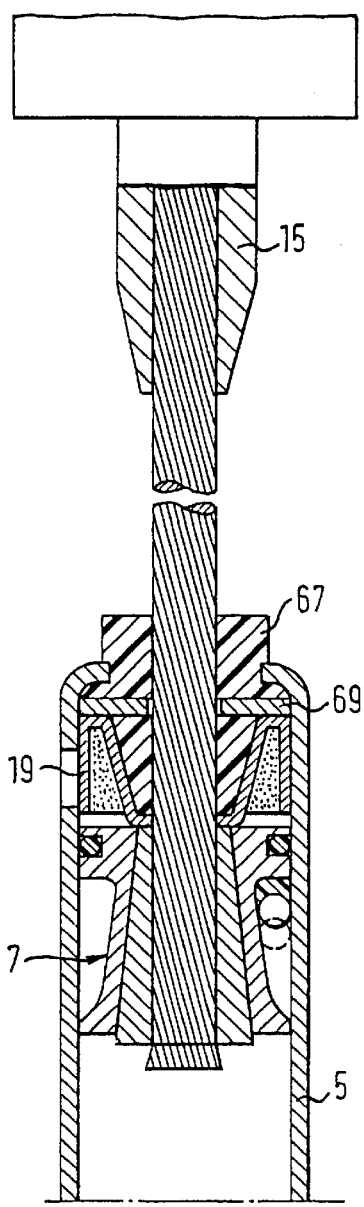
FIG. 15 shows an embodiment of the tensioner according to the invention, in which the thimble narrows conically towards the cylinder, in non-actuated state.
Figure 16:
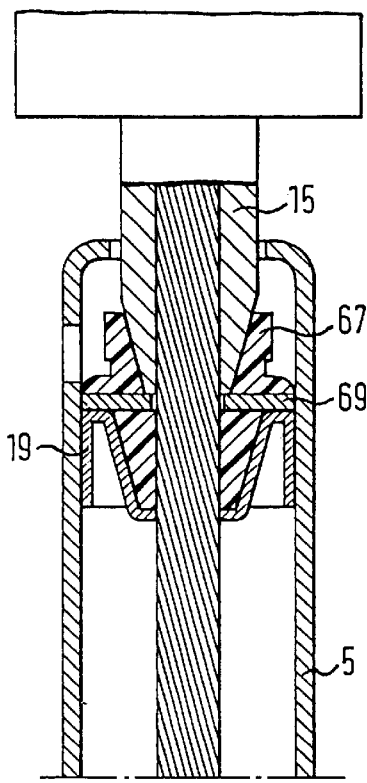
FIG. 16 shows the tensioner shown in FIG. 15 with the thimble having penetrated into the damping piston.

The embodiment illustrated in FIGS. 15 and 16 corresponds substantially to that illustrated in FIGS. 13 and 14, but with the thimble 15 having a conically narrowing end facing the cylinder 5, by which end the thimble 15 penetrates into the damping piston 67 and deforms it radially and also tears it from its fastening on the cylinder 5 and pushes it further into the interior of the cylinder (cf. FIG. 16).

What is claimed is:

1. A tensioner for a safety belt comprising a piston/cylinder unit (3) having a cylinder (5) and a piston (7) arranged in the interior of said cylinder, a compressed gas source (17), on the activation of which the piston (7) is displaced, a belt engaging means (13) for engaging the safety belt, a traction transfer means (11) for connecting the piston (7) with the belt engaging means (13), and a damping means for the absorption of energy on deceleration of the movement of the belt engaging means (13), wherein the cylinder (5) has a first end closer to the belt engaging means (13) and a second end further away from it, the damping means has a first part connected with the traction transfer means (11), surrounding the traction transfer means (11) and arranged outside the cylinder (5) in the non-actuated state of the tensioner, and having a second part connected with the cylinder (5) and provided on an end wall (23) at the first end, the parts being moved towards each other on tensioning and providing for the damping, characterized in that the first part displaces the second part from a first position to a second position spaced apart from the first position at least partially into the interior of the cylinder (5) during the damping process.

2. The tensioner according to claim 1, wherein the first part strikes onto the second part and displaces the second part from the first position to the second position spaced apart from the first position into the interior of the cylinder (5).

3. The tensioner according to claim 1, wherein the first part penetrates into the second part and displaces the second part from the first position to the second position spaced apart from the first position into the interior of the cylinder (5).

4. The tensioner according to claim 1, wherein the first part penetrates into the second part and the first part moves into the interior of the cylinder (5).

5. The tensioner according to claim 1, wherein the second part forms at least one section of the end wall of the cylinder (5) at the first end.

6. The tensioner according to claim 5, wherein the second part is constructed as a separate part fastened to the cylinder (5) and released by the first part.

7. The tensioner according to claim 1, wherein the second part is constructed as a seal which separates the interior of the cylinder (5) from the exterior of the cylinder (5) and has an opening through which the traction transfer means (11) extends.

8. The tensioner according to claim 7, wherein a sealing material is provided between the outer surface of the traction transfer means (11) and the second part.

9. The tensioner according to claim 7, wherein when the tensioner (1) is not actuated, the seal exerts a clamping force on the traction transfer means (11) enabling the clamping force to counteract an unintentional rotation and an axial displacement of the traction transfer means.

10. The tensioner according to claim 5, wherein the second part is fastened at its peripheral rim to the cylinder (5) by rolling.

11. The tensioner according to claim 1, wherein the second part has a sleeve-shaped section (43), which in the non-actuated state of the tensioner (1) is situated substantially outside the cylinder (5), and an actuated state of the tensioner wherein the first part strikes against the sleeve-shaped section (43) and deforms it in a plastic manner.

12. The tensioner according to claim 1, wherein the second part is made of metal.

13. The tensioner according to claim 1, wherein a working space (25) inside the cylinder (5) is provided for the gas, and also a stop (55) is provided for the piston (7), and whereby the position of the first and of the second part of the piston (7) and of the stop (55) are coordinated with each other such that after the striking of the piston (7) onto the stop (55), the volume of the working space (25) is reduced by the penetration of at least one of the two parts into the interior of the cylinder (5).

14. The tensioner according to claim 1, wherein a damping piston (37; 67) in the non-actuated state of the tensioner (1) is arranged in a region of the first end of the cylinder (5), and thereby is displaced by the first part towards the piston (7) and reduces the volume of the working space (25).

15. The tensioner according to claim 14, wherein the second part is coupled with the damping piston (37; 67).

16. The tensioner according to claim 14, wherein the damping piston (37; 67) is connected integrally with the second part, forming one piece.

17. The tensioner according to claim 14, wherein a radial gap between the damping piston (37; 67) and an inner face of the cylinder (5) becomes smaller with an increasing distance covered by the damping piston (37; 67).

18. The tensioner according to claim 1, wherein a fastening means (49) for connecting the traction transfer means (11) with the piston (7) and is constructed so that the traction transfer means (11) is uncoupled from the piston (7) on deceleration of the piston (7).

19. The tensioner according to claim 18, wherein the piston (7) has an opening through which a free end of the traction transfer means (11) facing the piston extends, and that the fastening means (49) has a carrier arranged at the free end and transferring force in the tensioning direction (R), which on deceleration of the piston (7) detaches itself therefrom and together with the traction transfer means (11) moves further in the tensioning direction (R).

20. The tensioner according to claim 19, wherein the carrier is a cone and the opening in the piston (7) is constructed so as to be complementary to the cone.

21. The tensioner according to claim 1, wherein the compressed gas source (17) is arranged inside the cylinder (5) and adjoins the end wall at the first end of the cylinder (5).

22. The tensioner according to claim 21, wherein the compressed gas source (17) has a hollow housing (19) in the shape of a circular ring and filled with propellant.

23. The tensioner according to claim 1, wherein the first part has an outer contour conically tapered towards the second part.

24. The tensioner according to claim 1, wherein interference contours projecting from an inner face of the cylinder (5), and said contours can be traveled over by the piston (7) and decelerate it.

25. The tensioner according to claim 1, wherein the belt engaging means (13) is a belt buckle.

26. The tensioner according to claim 25, wherein the first part is a thimble (15) serving to fasten the belt buckle to the traction transfer means (11).

27. The tensioner according to claim 25, wherein the belt buckle has a housing (29) and the first part penetrates into the interior of the cylinder (5) up to the stop of the housing (29) on the cylinder (5).

28. The tensioner according to claim 27, wherein the housing (29) has at least one rib (35) on the end face facing the cylinder, whereby said rib (35) strikes onto the cylinder (5) toward the end of the movement of the housing and in so doing is plastically deformed.

29. The tensioner according to claim 1, wherein the traction transfer means (11) is a traction cable.

30. The tensioner according to claim 1, wherein the cylinder (5) is provided at its second end with an opening into which the traction transfer means (11) penetrates toward the end of its movement.

31. The tensioner according to claim 30, wherein the traction transfer means (11), towards the end of its movement, extends through the opening to outside the cylinder (5).

32. The tensioner according to claim 30, wherein an elastic spring member (53) inside the cylinder (5), which provides for a certain resetting of the belt articulation member (13) after the tensioning and the damping of the movement of the belt articulation member (13) have been completed.

33. The tensioner according to claim 5, wherein the second part is fastened at its peripheral rim to the cylinder (5) by beading.

* * * * *

UNITED STATES PATENT AND TRADEMARK OFFICE
CERTIFICATE OF CORRECTION

| | |
|---|---|
| PATENT NO. | : 6,250,720 B1 |
| DATED | : June 26, 2001 |
| INVENTOR(S) | : Franz Wier |

It is certified that error appears in the above-identified patent and that said Letters Patent is hereby corrected as shown below:

Column 9,
Line 4, change "it in a plastic manner" to -- plastically --

Signed and Sealed this

Seventh Day of May, 2002

Attest:

JAMES E. ROGAN
*Attesting Officer*     *Director of the United States Patent and Trademark Office*